July 20, 1965    F. A. KROHM    3,195,162
WINDSHIELD WIPER BLADE ASSEMBLY
Filed Aug. 11, 1960
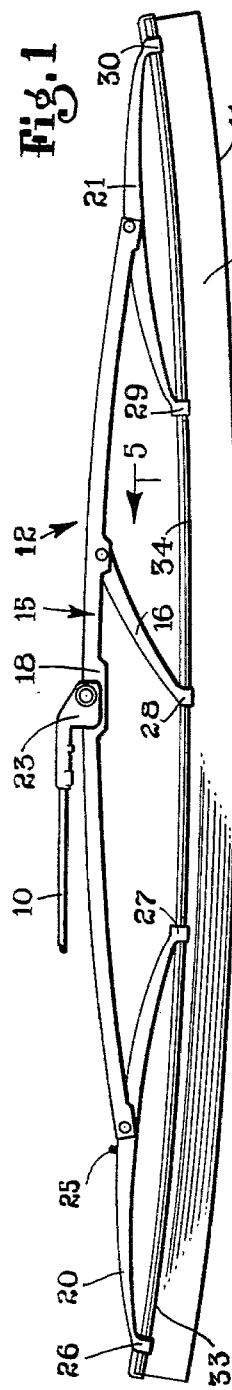
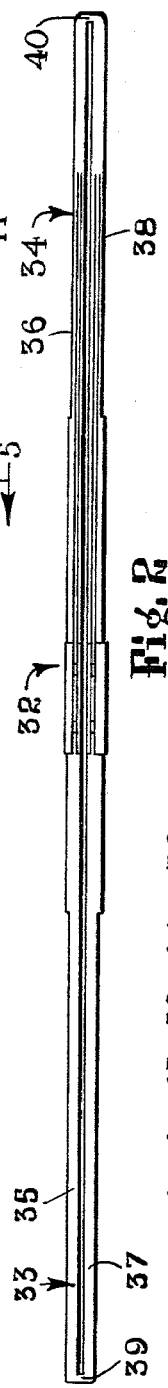
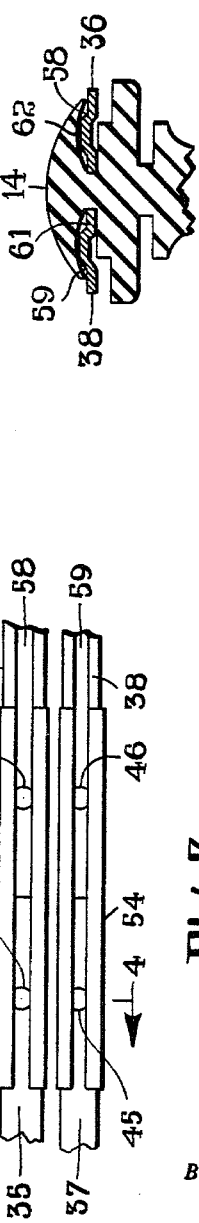
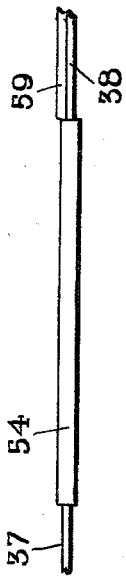
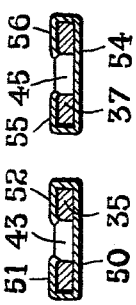
INVENTOR.
FRED A. KROHM
BY W. E. Recktenwald
P. J. Rose
ATTORNEY

United States Patent Office 3,195,162
Patented July 20, 1965

3,195,162
WINDSHIELD WIPER BLADE ASSEMBLY
Fred A. Krohm, Hobart, Ind., assignor to The Anderson Company, a corporation of Indiana
Filed Aug. 11, 1960, Ser. No. 49,049
8 Claims. (Cl. 15—250.42)

This invention relates generally to improvements in windshield wiper blade assemblies and more specifically to improvements in backing strips for the resilient wiper elements thereof.

Motor vehicle windshields have progressed through the years from the flat type to the moderately curved type to the more sharply curved wrap-around type and, more recently, to a compoundly curved type curving not only toward the sides of the vehicle but also vertically toward the roof of the vehicle. With larger glass areas windshield wiper blades have had to be made longer, and it has become a problem to provide a good wiping action at the sharply curved portions of the windshield traversed by the outer end of the wiper blade. Further, the problem making longer backing strips or flexors for the resilient wiper elements without scrapping the machines and equipment designed to make shorter flexors has arisen.

Another object of my invention is to provide an improved windshield wiper blade assembly.

A further object of the invention is to provide an improved flexor or backing strip for resilient wiper elements of windshield wiper blades.

A still further object of the invention is to provide a flexor or backing strip for resilient wiper elements of windshield wiper blades in which the flexing characteristics of various portions of the flexor are tailor-made in accordance with the degrees of curvature of the portions of the windshield which the respective portions of the flexor and associated resilient wiper element must traverse in the operation of the windshield wiper blade assembly.

Yet another object of the invention is to provide a means of making longer flexors or backing strips for resilient wiper elements of windshield wiper blades using machines and equipment designed for making shorter flexors.

Other objects and advantages of the invention will become apparent after the description hereinafter set forth is considered in conjunction with the drawings annexed hereto.

FIGURE 1 is a side elevational view of a representative windshield wiper blade assembly embodying the improved flexor of the invention;

FIGURE 2 is a plan view of the improved flexor of my invention;

FIGURE 3 is a fragmentary enlarged view of the central portion of FIGURE 2;

FIGURE 4 is a cross-sectional view through the flexor taken along section line 4—4 of FIGURE 3;

FIGURE 5 is a cross-sectional view through the flexor and associated resilient wiper element taken along section line 5—5 of FIGURE 1; and FIGURE 6 is a side elevational view of the portion of the flexor shown in FIGURE 3.

In FIGURE 1, numeral 10 indicates a wiper arm of which only the outer end is shown. It will be understood that the inner end of wiper arm 10 is adapted to be connected to a pivot shaft mounted along an edge portion of a motor vehicle windshield, and that means are provided for urging the outer end of wiper arm 10 toward the windshield when the windshield wiper blade assembly is mounted on a vehicle in association with the windshield thereof.

Connected to the outer end of arm 10 is a wiper blade assembly 12 comprising a pressure-transmitting or pressure-distributing superstructure 15 which includes a stabilizing link 16, and a wiper blade which includes an elongate resilient wiper element 14 and a backing strip or flexor 32 therefor. The pressure-transmitting superstructure 15 includes a bridge member 18 and a pair of secondary yoke members 20 and 21 pivotally connected to the opposite ends of bridge member 18. The yoke member 21 is shorter than the yoke member 20 for reasons related hereinafter. The bridge member 18 is pivotally connected to a connecting member 23 attachable to wiper arm 10.

Bridge member 18, yoke members 20 and 21, and stabilizing link 16 are moderately longitudinally curved channel members. Stabilizing link 16 is pivotally connected to bridge member 18 and is provided for stabilizing wiper element 14 against lateral vibration and chatter and against torsional deformation and distortion of the central portion thereof.

Yoke member 20 is releasably attached to bridge member 18 by means of a latching mechanism operable by a button 25. The latching mechanism forms no part of the present invention and is not herein further shown or described.

Yoke member 20 is formed at one end with a pair of spaced-apart inwardly directed claws 26 and at the other end with a pair of spaced-apart inwardly directed claws 27. Similar claws 28 are provided on the end of stabilizing link 16 remote from bridge member 18. Further, yoke member 21 has pairs of spaced-apart inwardly directed claws 29 and 30 at opposite ends thereof. These claws slidingly embrace the improved resiliently flexible support, backing strip, or flexor 32. The flexor 32 is formed of two separate portions 33 and 34 secured together in abutting end-to-end relationship, and in assembling, portion 34 is slipped through claws 28, 29, and 30 in that order, and then yoke member 20 is applied to portion 33 by slipping claws 27 and 26 thereon in that order. Thereafter, yoke member 20 is latched to bridge member 18 by operation of button 25.

As noted above, the yoke member 21 is shorter than the yoke member 20. Claws 29 and 30 are therefore spaced closer together than claws 26 and 27. This closer spacing of claws 29 and 30 results in the distribution of pressure from yoke member 21 over a shorter length of flexor 32, in order that flexor 32 may be more readily flexed at its outer end to conform with the more sharply curved portions of the windshield which it and associated resilient wiper element 14 must traverse.

Portion 33 is slit from the end-abutting portion 34 almost completely along the length thereof to form free end portions 35 and 37 integrally joined only by a hingelike part 39 at the end of portion 33 remote from portion 34. Similarly, portion 34 is slit from the end-abutting portion 33 almost completely along the length thereof to form free end portions 36 and 38 integrally joined only by a hingelike part 40 at end of portion 34 remote from portion 33. Portion 35 abuts portion 36, and portion 37 abuts portion 38. As shown in FIGURE 3, portions 35, 36, 37 and 38 are provided with holes 43, 44, 45 and 46, respectively, adjacent abutting ends.

A sleeve-like fastening member 50 is formed tightly around abutting ends of portions 35 and 36 and bent-over edge portions 51 and 52 thereof in the vicinities of holes 43 and 44 are partially extruded into said holes, as shown in FIGURE 4 for hole 43 in portion 35. Similarly, a sleeve-like fastening member 54 is formed tightly around abutting ends of portions 37 and 38 and bent-over edge portions 55 and 56 thereof in the vicinities of holes 45 and 46 are partially extruded into said holes, as shown in FIGURE 4 for hole 45 in portion 37. By this means, portions 33 and 34 are fastened together as securely as though they were one piece, and yet different flexing characteristics may be provided. For example, portion 34, the outer portion of flexor 32, may be made thinner and more flexible than portion 33. Further, the flexing characteristics of portion 34 may be altered as desired, as by providing stiffening ribs 58 and 59 respectively in portions 36 and 38 thereof. Stiffening ribs 58 and 59 may stop short of the outer end of portion 34, so that the outer end will be more readily flexed when it traverses sharply curved portions of the windshield.

The slit in flexor 32 extends from hingelike part 39 of portion 33 to hingelike part 40 of portion 34. The slit may be temporarily enlarged to enable resilient wiper element 14 to be inserted therein. This can be accomplished by pulling fastening members 50 and 54 apart while parts 39 and 40 act as though they were hinges. The wiper element 14 may be formed in one piece of resilient material such as rubber and may be provided with a wiping edge 11, a groove 62 (FIG. 5) on one side, and a groove 61 on the other side. The grooves 62 and 61 are provided to receive portions 35 and 36 and portions 37 and 38, respectively, as fastening members 50 and 54 are moved back together. With wiper element 14 thus mounted, flexor 32 may be assembled in pairs of claws 26, 27, 28, 29 and 30, as explained above.

It will be seen that I have provided an improved flexor for a windshield wiper blade assembly, the flexor being made of two separate portions, which may have different flexing characteristics, secured together by a pair of sleeve-like fastening members formed over abutting ends of the flexor portions. I have found that a windshield wiper blade assembly having a flexor constructed in accordance with my invention gives improved wiping performance in cases where the wiper blade is long and the windshield is sharply curved in portions traversed by the outer end of the wiper blade.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper comprising an elongate flexible backing strip, a resilient wiper element provided with an upper surface, a wiping edge and groove means disposed between said edge and upper surface, said backing strip being disposed in said groove means, said backing strip being formed of two separate portions of different thickness, and sleeve means for rigidly securing and reinforcing inner ends of said backing strip portions together in an end to end relationship, said sleeve means also being disposed in said groove means below said upper surface of said wiper element.

2. A windshield wiper comprising pressure-transmitting means, a flexible elongate backing strip carried by said pressure-transmitting means, a resilient wiper element having an upper surface and provided with external longitudinally extending side grooves receiving said backing strip, said backing strip being formed of two separate portions, each portion being slotted longitudinally thereof substantially throughout its length and completely through at one end to provide a pair of free end portions on each of said backing strip portions, said backing strip portions being juxtapositioned to place the free end portions thereof in abutting end-to-end relationship, and sleeve means disposed entirely below said upper surface and substantially within the confines of said grooves for securing said backing strip portions together in said juxtaposition to prevent relative longitudinal movement between said end portions, said pressure-transmitting means including a bridge member, a pair of secondary yoke members respectively pivotally connected centrally thereof to opposite ends of said bridge member, and a stabilizing link pivotally connected at one end to said bridge member between the ends thereof, said backing strip being carried by opposite ends of said yoke members and the other end of said stabilizing link engaging said sleeve means.

3. An assembly comprising a windshield wiper blade and a pressure device, said blade comprising an elongate resiliently flexible support and an elongate resilient wiper element, said support comprising two separate elongate portions, one of said portions offering a lesser resistance to flexure than the other of said portions, elongate means serving to reinforce inner ends of said separate portions and fixedly secure the same against axial separation, said pressure device being provided with means for attaching the assembly to a wiper arm and comprising a long yoke, a short yoke and a bridge connected to said yokes, said long yoke having its ends operatively connected to said one portion of said support, and said short yoke being operatively connected to said other portion of said support.

4. Elongate support means for an elongate resilient wiper element having an upper surface and a wiping edge with elongate groove means therebetween, said support means comprising a pair of elongate members disposed in said groove means, each of said members having an inner enlarged extremity and an outer narrower extremity, and separate means also disposed in said grooves and below said upper surface connecting said enlarged extremities and maintaining said members in axial alignment.

5. Elongate support means for an elongate resilient wiper element, said support means comprising a pair of elongate members, one of said members having a substantially uniform degree of flexure throughout the major portion of its length and the other of said members having a different substantially uniform degree of flexure throughout the major portion of its length, abutment means provided on said members, and sleeve means receiving said members and engaging said abutment means serving to secure said members in axial alignment.

6. Means for supporting an elongate resilient wiper element provided with a pair of elongated receiving means, said supporting means comprising a first pair of elongate resiliently flexible members disposed in one of said receiving means and having inner ends, a second pair of elongate resiliently flexible members disposed in the other of said receiving means and having inner ends, and a pair of separate fasteners respectively connecting said inner ends of said pairs of members and maintaining said members of each pair substantially in axial alignment, said fasteners being respectively substantially confined in said receiving means.

7. Means for supporting an elongate resilient wiper element, said supporting means comprising a first pair of elongate resiliently flexible members having inner enlarged extremities and outer narrower extremities, a second pair of elongate resiliently flexible members having inner enlarged extremities and outer narrower extremities, and a pair of separate fasteners respectively connecting said inner enlarged extremities of said pairs of members and maintaining said members of each pair substantially in axial alignment.

8. Means for supporting an elongate resilient wiper element, said supporting means comprising a first pair of elongate members having inner ends and outer ends, a second pair of elongate members having inner ends and outer ends, a separate fastener connecting said inner ends of one pair of members and maintaining said members substantially in axial alignment, another fastener connecting the inner ends of said second pair of members and maintaining these members substantially in axial alignment, and means connecting said outer ends of said pairs of members for maintaining said pairs in a predetermined spaced parallel relationship.

References Cited by the Examiner

UNITED STATES PATENTS

| | | | |
|---|---|---|---|
| 2,202,301 | 5/40 | Probst | 267—1 |
| 2,659,923 | 11/53 | Horton | 15—250.42 |
| 2,782,443 | 2/57 | Krohm | 15—250.42 |
| 2,814,821 | 12/57 | Wallis | 15—250.42 X |
| 2,859,468 | 11/58 | O'Shei | 15—250.42 |
| 2,918,688 | 12/59 | O'Shei | 15—250.42 |
| 2,920,336 | 1/60 | Anderson | 15—250.42 |
| 3,131,413 | 5/64 | Anderson | 15—250.42 |

FOREIGN PATENTS

| | | |
|---|---|---|
| 1,213,331 | 10/59 | France. |
| 785,865 | 11/57 | Great Britain. |
| 1,222,775 | 1/60 | France. |

CHARLES A. WILLMUTH, *Primary Examiner.*

SIDNEY JAMES, *Examiner.*